United States Patent [19]

Prevignano et al.

[11] 4,445,127

[45] Apr. 24, 1984

[54] PRINTING-NEEDLES DEVICE

[75] Inventors: Paolo Prevignano; Armando Peretti, both of Ivrea, Italy

[73] Assignee: Ing. C. Olivetti & C., S.p.A., Ivrea, Italy

[21] Appl. No.: 383,180

[22] Filed: May 28, 1982

[30] Foreign Application Priority Data

Jun. 4, 1981 [IT] Italy .............................. 67768 A/81

[51] Int. Cl.[3] ............................................ G01D 15/16

[52] U.S. Cl. ................................................ 346/140 A

[58] Field of Search ........................... 346/75, 140, 1.1

[56] References Cited

U.S. PATENT DOCUMENTS

| | | | |
|---|---|---|---|
| 1,360,823 | 11/1920 | Thwing | 346/140 X |
| 1,720,226 | 7/1929 | Lovejoy | 346/140 A |
| 3,102,770 | 9/1963 | McKeegan | 346/140 R |
| 3,120,804 | 2/1964 | Besenick | 346/140 A UX |
| 3,340,541 | 9/1967 | Klassen et al. | 346/140 A |
| 3,361,516 | 1/1968 | Rigondaud | 346/140 UX |

*Primary Examiner*—Donald A. Griffin

*Attorney, Agent, or Firm*—Banner, Birch, McKie & Beckett

[57] ABSTRACT

A printing-needles device to write on a registration support alphanumerical characters and graphic symbols according to a dots matrix in which the dots are printed by directly inking of writing ends of the needles without interposition of inked ribbon between needles and registration support. The ink is contained in a removably mounted cartridge and is carried by capillarity from cartridge to needles by means of cloth-fibres cable which has an end dipped into ink and the other end in contact with a side of needles. The needles have opposite side guided by a lateral wall perpendicular to terminal wall which guides the writing ends.

5 Claims, 6 Drawing Figures

PRINTING-NEEDLES DEVICE

The here mentioned invention is referred to a printing-needles device to write on a registration alphanumerical support and graphic symbols according to a points matrix and including a structure on which the needles are axially running fitted upon the control of correspondent means of execution and means to ink directly the writing ends of needles.

It is known a printing-needles device without interposition of inked ribbon, in which needles, near their writing ends, cross some fibres of blotting material placed into a cavity obtained between the terminal guides of the same needles. The fibres are dipped into ink and by capillarity, they ink the writing ends of needles. In this device there is the inconvenience that inking fibres are difficult to be removed, being arranged higgledy-piggledy into the cavity in order to wrap-up needles. This trouble is not negligible considering that during running of device the fibres are wearing out and damaging, owing whether to rubbing od needles or to impurities of which they can be imbued. The periodic replacement of fibres is therefore indispensable to grant the contact fibres-needles.

The first purpose of here mentioned invention is to have a printing-needles device in which the writing takes place without interposition of inked ribbon, which is quick, reliable and cheap and in which the inking-needles element could be easy removed to be replaced. Following up to this first purpose the printing-device according to invention is characterized by what inking-means include: a removable ink-container fitted on needles-assembling structure and supplied with a cloth-fibres cable having an end dipped into ink inside of container and the opposite end in contact with needles near their writing ends.

Other general problem of printing parts by direct inking and partilarly in those by needles, in which the distance from head to the registration support is only few thenths of millimeters is that to get a print clear in contrast but without stains. A second purpose of this invention is therefore to realize a device as above described, in which the print is clear and the transfer of ink on registration support is always good controlled during translation movement of head or during advancement of support.

According to this second purpose the device following up to invention is characterized by what the terminal guide of needles includes a fore part supplied with a vertical groove to collect the excessive ink on needles and an horizontal embrasure which is in communication with said vertical groove to carry the collected ink to the cloth-fibres cable.

Figure 1:
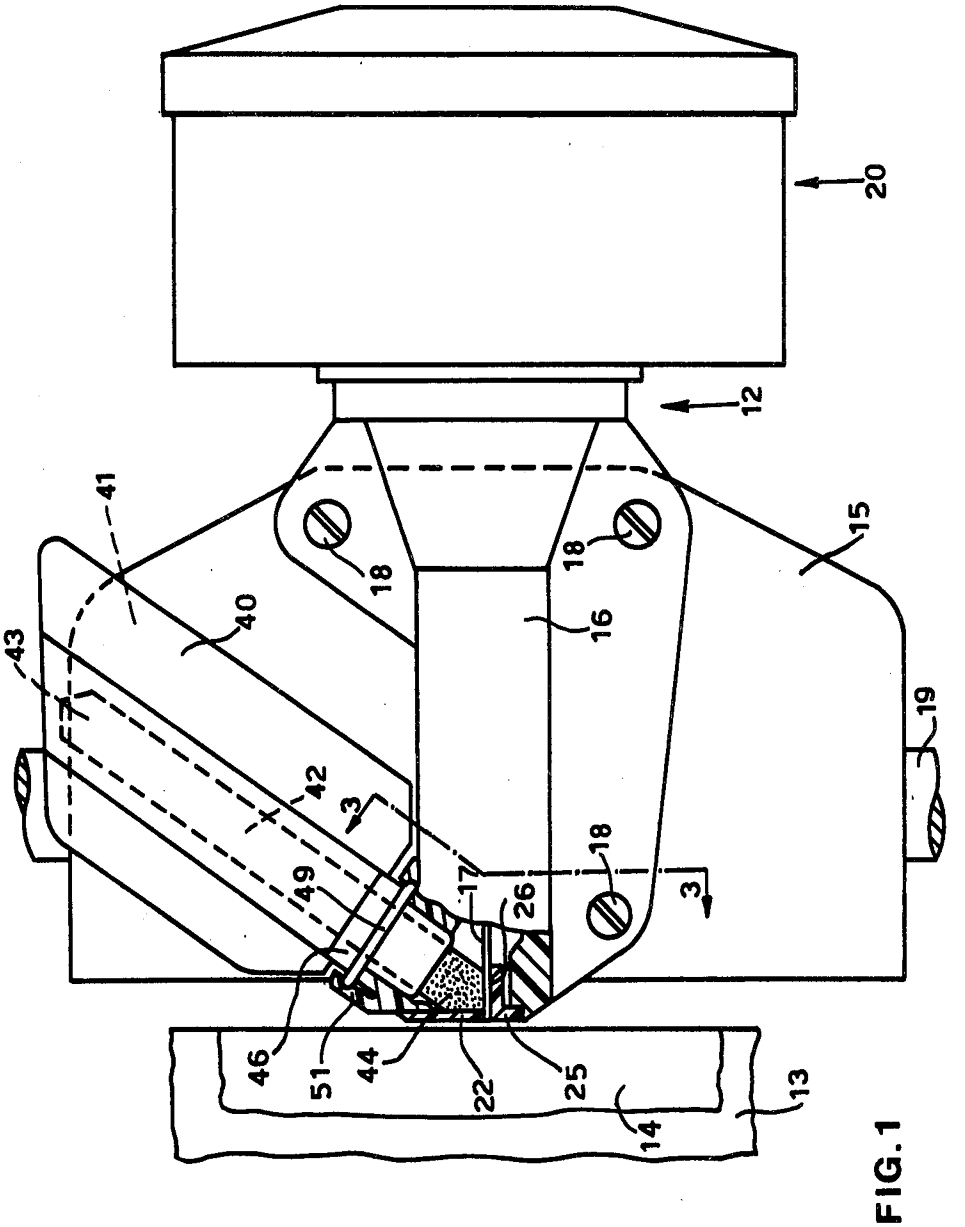
Figure 2:
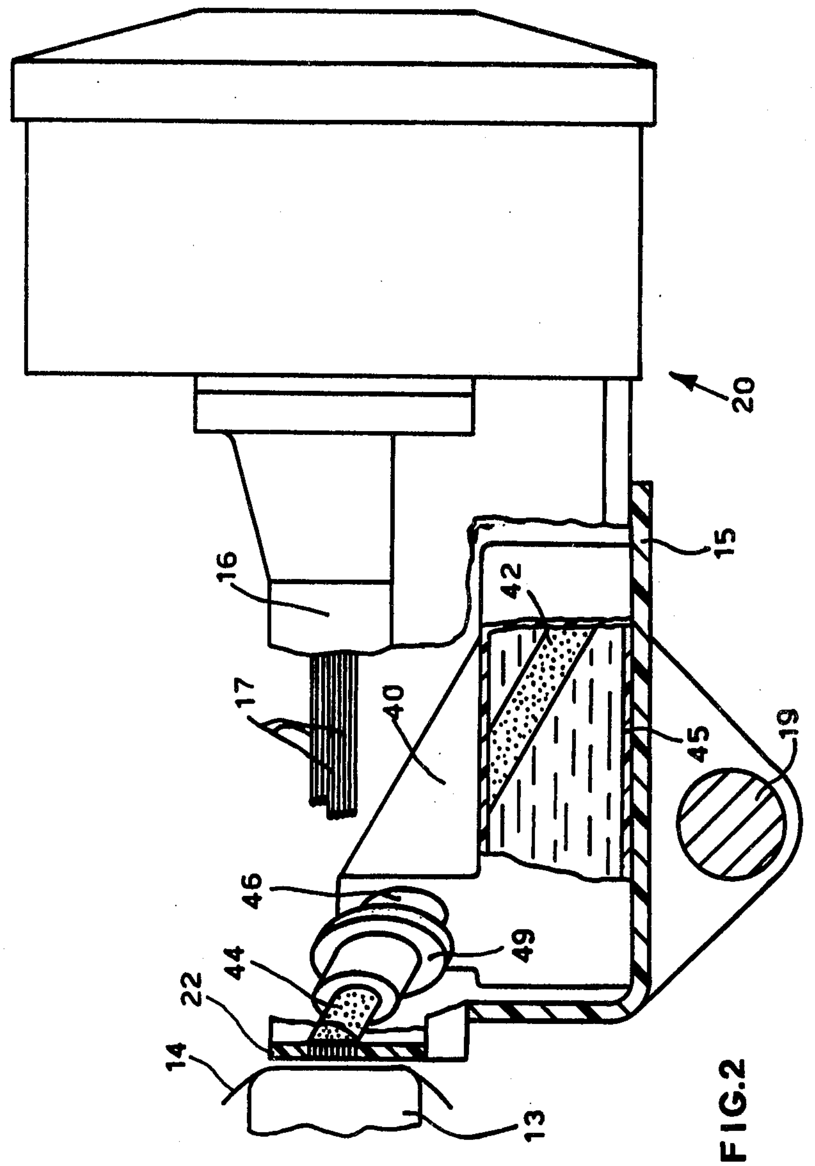

This and other characteristics of the invention will be cleared by following description of some preferable forms of execution, done for example and not limitative, with the help of enclosed drawings, in which:

FIG. I. is a plan view, partially sectioned, of printing device of invention according to first form of execution;

FIG. 2. is a lateral view, partially sectioned, of printing device of FIG. I.

Figure 3:
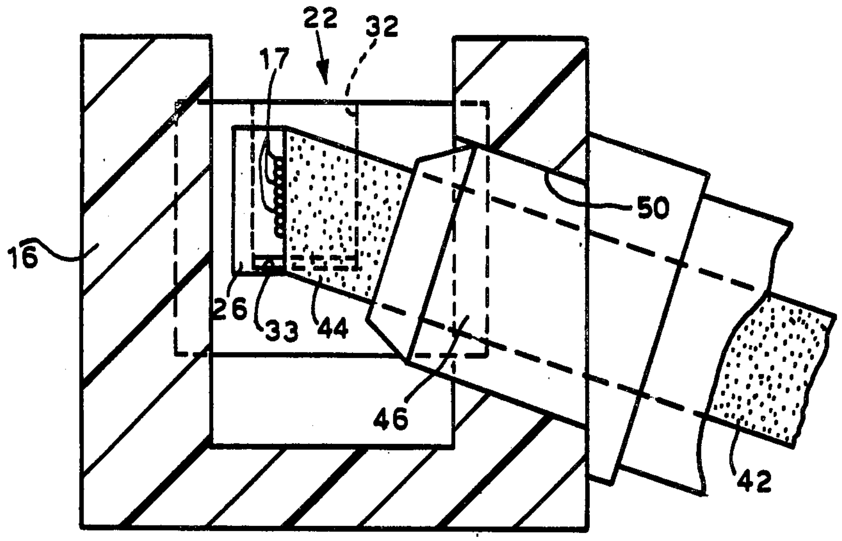
Figure 4:
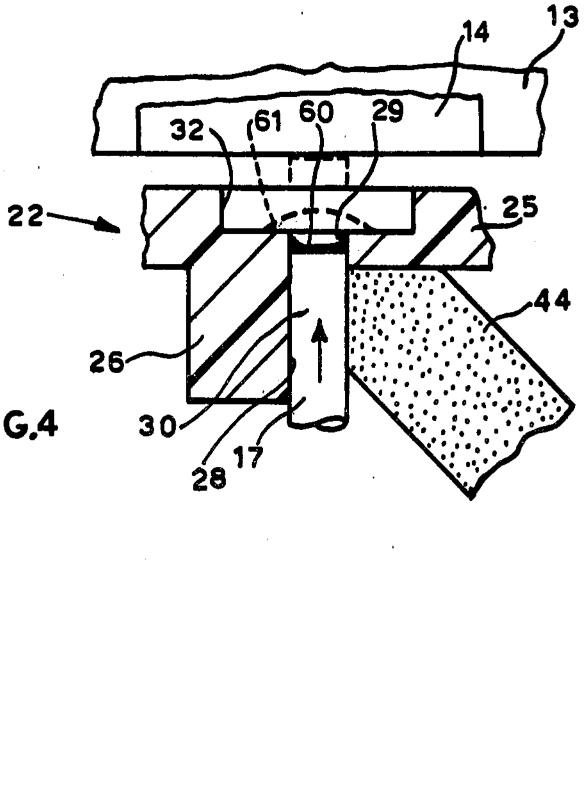
Figure 5:
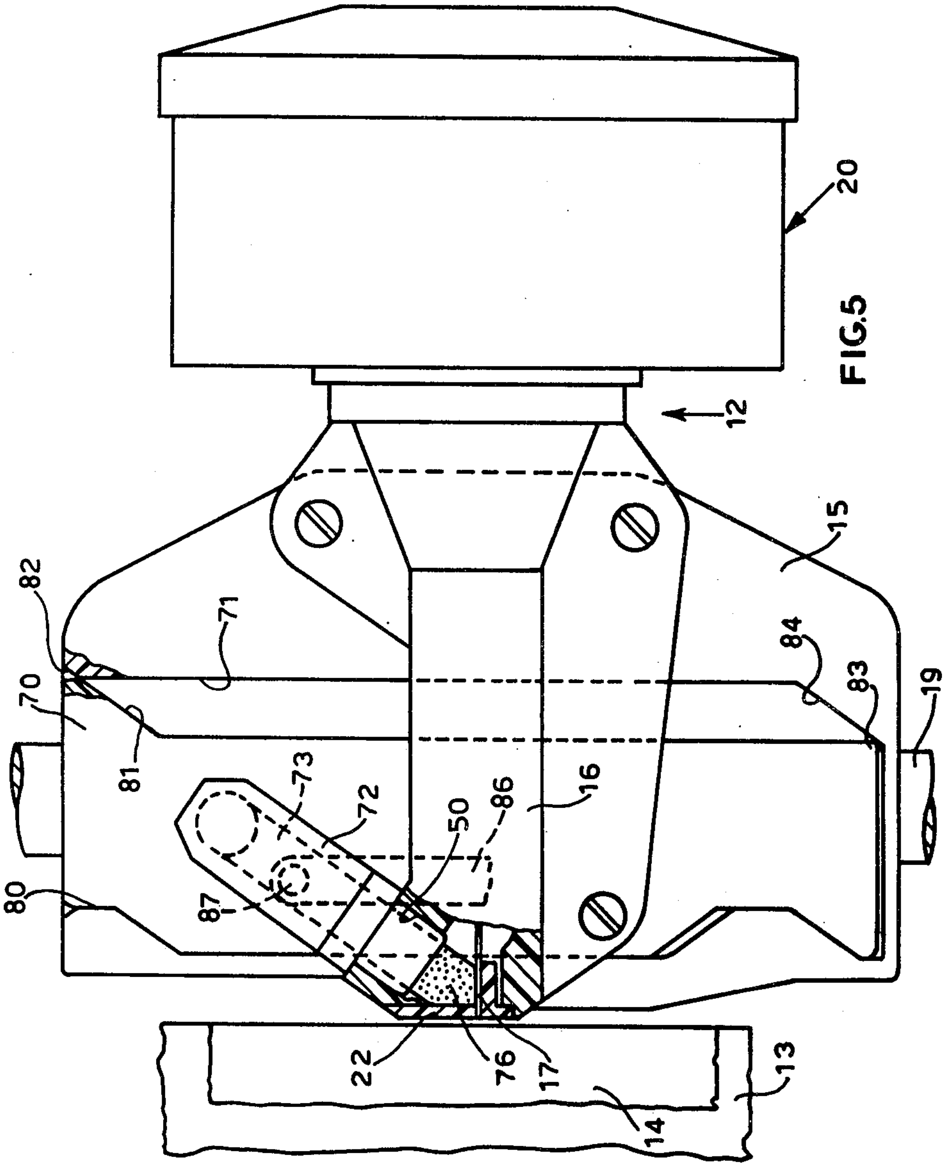
Figure 6:
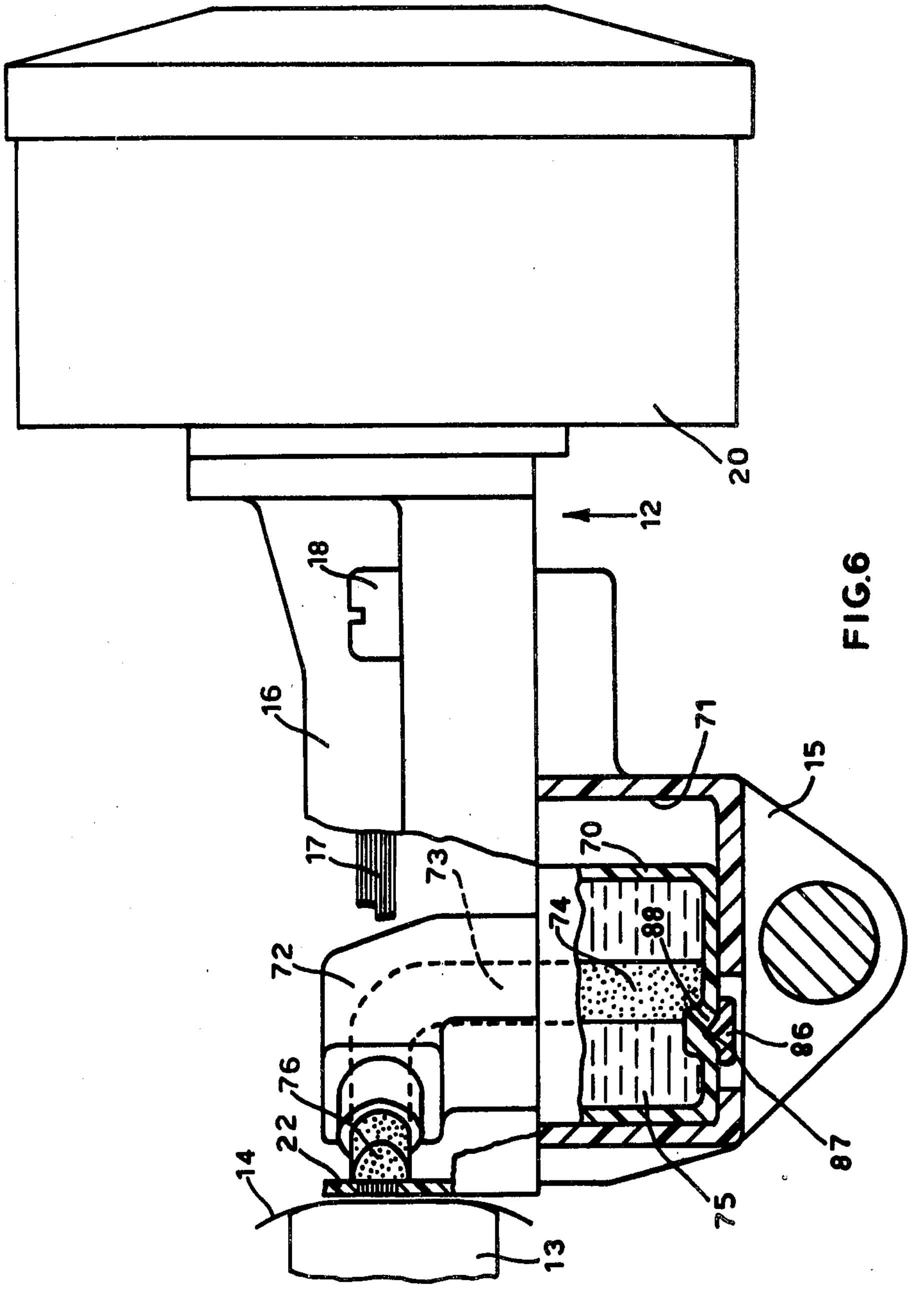

FIG. 3. is a section according to line 3—3 of FIG. I;

FIG. 4. is an enlarged detail of FIG. I;

FIG. 5. is a plan view, partially sectioned of invention device, according to a second form of execution;

FIG. 6. is a lateral view, partially sectioned, of device of FIG. 5.

The printing device according to invention, includes a writing head I2 (FIG. I), fitted by mean of screws I8 on a carriage I5. The carriage I5 is sliding on a guide I9 parallel to a bar I3 against which is resting to a registration support I4 for example a sheet of paper.

The writing head I2 includes a fore rigid structure I6 on internal of which is fitted, axially sliding, a plurality of printing-needles I7 of hard metallic material. A correspondent assembly of carrying out magnets, joined to needles, I7 is fitted posteriorly to head I2 structure I6. The fore structure I6, needles I7 and magnets 20, are of known type for example of kind described in U.S. patent-application Ser. No. 292,173 filed on Aug. 21, 1981 and assigned to the same assignee of the present application and which for shortness are'nt herewith again described in detail. Besides, as referred to the present invention, these components could be to tally different from those illustrated on above mentioned patent-application without being prejudicial to appliance of invention. The needles I7, near the bar I3, are alined on a single vertical level and are guided by a terminalslide 22, of high hardeness material, which is fixed to the fore structure I6 of head I2. According to an invention characteristic, the slide 22, (FIGS. 3–4) is moulded in order to have a frontal wall 25 and a lateral wall 26, perpendicular between themselves. The frontal wall 25 includes a plurality of through holes 29 where the writing ends 30 of needles are fitted. The lateral wall 26 has a surface 28 with semicylindrical slots alined with holes 29, in order to guide a needles side I7. The frontal wall 25 has a vertical slot 32, alined with holes 29 on surface looking over the sheet I4, and on horizontal through slit 33 which is in contact with the bottom of vertical slot 32. To ink the writing ends 30 of needles I7, a container 40 (FIGS. I–2) of plastic material which can be removed, is fitted on the fore structure I6 of head I2. Inside the container 40, there is liquid ink 4I of known type.

The container 40 rests with its base 45 on carriage I5 and has in its internal a cable 42 of cloth-fibres, for example of cellulose acetate. The cable 42 is oblique as referred to body of container 40 and has an inferior end 43 dipped into ink 4I, and a superior end 44 moulded as a wedge, which is projecting from an appendix 46 of the same container to be fitted inside the head I2 structured I6, in contact with needles I7. In particular the superior appendix 46 of container 40 can be inserted in a hole 50 obtained from a side of fore head I2 structure I6. During use, a collar 49 obtained from a superior appendix 46 of container 40, can cooperate with an elastic tongue 5I, obtained in piece from structure I6, near the hole 50 which keeps exactly positioned the container 40 on the structure I6. The inking of needles I7, takes place by capillarity by mean of cable 42 which, collects upward the ink 4I contained in container 40, keeping constantly wet the needles sides I7. Always be capillarity, the ink wets the walls of guide-holes 29 and the places itself before the writing ends 30 of needles I7. The ink is settling before the needles I7 as a meniscus 60 (FIG. 4). The eventual ink drops 6I before needles I7, especially at resting conditions, wet the slot 32 walls and cannot have dimensions similar to spot the support I4, which is normally distant few tenth of millimeters from the frontal wall 25. When are excessively big, drops 6I, due to gravity, flow down toward the bottom of vertical slot and through the horizontal slit 33 are soaked again due to capillarity by cable 42. The transfer of ink which settles itself before the writing ends 30 of needles I7, takes place in known way, due to selective carrying out of electromagnets 20 collected with wires I7. Also the printing of alphanumerical characters and graphic symbols takes place in known way, according to a matrix of points, for the combined action of head movement I2 before the support I4 and carrying out of needles I7. When ink 4I of container 40 is finished, this one can be easy removed from head I2, in spite of tongue action 5I, and can also be easy replaced by another container 40 full of ink. As information, the ink of a container with a capacity of 30 cm³ allows the printing of approximately 3 milion of characters with an acceptable wear for the end of cable 42.

According to another form of carrying out, shown in FIGS. 5–6, a container 70 as a parallelepiped is inserted into a correspondent cavity 7I obtained on carriage I5. The container 70 has a superior appendix 72 as an inverted I inside of which is placed a cable 73 of cloth-fibres, similar to cable 42. An inferior end 74 of cable 42 is dipped into ink 75 contained in container 70 and one of its superior end 76, moulded as a wedge, is in contact with the writing needles I7 sides of head I2.

The container 70 can be inserted into cavity 7I through a lateral opening 80 of cavity 7I. The width of opening 80 is the same of that of central body of container 70. The container 70 is moulded in order to have a slanting wall 8I which can cooperate with an edge 82 of cavity, and has an edge 83 which can cooperate with a slanting wall 84 of cavity 7I. When the container 70 is nearly totally entered into cavity 7I from the lateral opening 80 it is guided along a raking direction as referred to those of carriage I5 feed and needles I7 in order to allow to superior end 76 of cable 73 to easy enter into head I2 hole 50 and to contact needles I7. An elastic inferior tongue 86, supplied with a cusp 87 is able to cooperate with a conic cavity 88 obtained into container 70, to keep this one inside the cavity 7I during normal running of printing head I2. The inking of needles I7 takes place by capillarity at the same way as formerly described. From this description follows clear that into printing device according to invention the writing takes place by direct inking of needles I7 and following transfer of ink 4I from the end of needles to registration support I4, without inter position of an inked ribbon. The inking means of the needles include a container 40, 70 of ink which can be removed, fitted on a structure I6 of head and a cable 42, 73 of cloth-fibres having an end 43, 74 dipped into ink inside the container and the opposite end 44, 76 in contact with needles I7 near their writing ends 30.

It is clear that the printing-needles device up to here described can be modified without going out of limits of this invention.

What we claim is:

1. A printing-needles device to write on a registration support alphanumeric characters and graphic symbols according to a dot matrix, comprising a plurality of printing needles each one having a writing end, a guiding structure for guiding said needles, and inking means for directly inking all the writing ends of said needles, the improvement wherein said inking means comprises a container for containing ink, a coth-fibres cable having a first end permanently dipped into ink inside said container and a second end opposite to said first end and external with respect to said container, and means for removably mounting said container on said guiding structure for bringing said second each of said cable into contact with all the writing ends of said needles.

2. A printing device, according to claim 1, wherein said container is located below said needles and includes a superior appendix to be inserted in a correspondent lateral hole obtained on said guiding structure.

3. A printing device, according to claim 1, wherein said guiding structure comprises a terminal guide having a frontal wall provided with through holes for guiding all the writing ends of said needles, a lateral wall perpendicular to said frontal wall having semicylindrical slots for laterally guiding said needles, said frontal wall having a vertical slot in correspondence with said through holes and a horizontal slit parallel to said semicylinndrical slots and in communication with said vertical slot, and wherein said second end of said cable is located between said lateral wall and a rear portion of said frontal wall when said container is mounted on said guiding structure.

4. A printing-needles device to write on a registration support alphanumeric characters and graphic symbols according to a dot matrix, comprising a plurality of printing needles each one having a writing extremity and a guiding zone near said writing extremity, the guiding zone of said needles lying in a single vertical plane, guiding means for guiding all said needles in their guiding zones, actuating means for axially moving said needles and inking means for directly inking all the writing extremities of said needles, the improvement wherein said guiding means comprises a terminal guide moulded in order to have a first vertical wall perpendicular to said vertical plane and provided with guide holes for said needles and a second vertical wall adjacent to said first vertical wall and parallel to said vertical plane needles, and wherein said inking means comprises a container for containing ink, a cloth-fibres cable having a first end permanently dipped into ink inside said container and a second end opposite to said first end and external with respect to said container, and means for bringing said second end of said cable in contact with said guiding zone of said needles at the opposite side with respect to said second vertical wall.

5. A printing device, according to claim 4, wherein said first end of said cable is moulded as a wedge, to lean against both vertical walls of said terminal guide.

* * * * *